US008997231B2

(12) United States Patent
Karta et al.

(10) Patent No.: US 8,997,231 B2
(45) Date of Patent: Mar. 31, 2015

(54) PREVENTIVE INTRUSION DEVICE AND METHOD FOR MOBILE DEVICES

(71) Applicant: Zimperium, Inc., Tel Aviv (IL)

(72) Inventors: Yaniv Karta, Ramat Gan (IL); Itzhak Avraham, Kfar Yona (IL)

(73) Assignee: Zimperium, Inc., San Francisco, CA (US)

( * ) Notice: Subject to any disclaimer, the term of this patent is extended or adjusted under 35 U.S.C. 154(b) by 72 days.

(21) Appl. No.: 13/865,212

(22) Filed: Apr. 18, 2013

(65) Prior Publication Data

US 2014/0181972 A1    Jun. 26, 2014

Related U.S. Application Data

(60) Provisional application No. 61/625,700, filed on Apr. 18, 2012.

(51) Int. Cl.
*H04L 29/06* (2006.01)

(52) U.S. Cl.
CPC ........ *H04L 63/1425* (2013.01); *H04L 63/1416* (2013.01); *H04L 63/0245* (2013.01)
USPC .................................. 726/23; 726/1; 726/22

(58) Field of Classification Search
USPC .......................................................... 726/23
See application file for complete search history.

(56) References Cited

U.S. PATENT DOCUMENTS 7,337,291 B2 *   2/2008   Abadi et al. .................. 711/163
7,577,992 B2 *   8/2009   Abadi et al. .................... 726/22
2009/0013407 A1 * 1/2009 Doctor et al. .................... 726/23
2009/0063809 A1 * 3/2009 Williams ........................ 711/208
2009/0092057 A1 * 4/2009 Doctor et al. ................. 370/252
2011/0041182 A1 * 2/2011 Stenfelt .......................... 726/23
2011/0060851 A1 * 3/2011 Monchiero et al. ............. 710/22
2011/0150002 A1 * 6/2011 Kim .............................. 370/474
2013/0031599 A1 * 1/2013 Luna et al. ....................... 726/1
2013/0305369 A1 * 11/2013 Karta et al. ..................... 726/23
2013/0347111 A1 * 12/2013 Karta et al. ..................... 726/23

OTHER PUBLICATIONS

Archibald, N., "Exploring Heap-Based Buffer Overflows with the Application Verifier," Cisco Blog, Mar. 29, 2010, 13 pages, [online] [retrieved on May 6, 2014] Retrieved from the internet <URL:http://blogs.cisco.com/security/exploring_heap-based_buffer_overflows_with_the_application_verifier/>.

(Continued)

*Primary Examiner* — Yonas Bayou
(74) *Attorney, Agent, or Firm* — Fenwick & West LLP (57) ABSTRACT

A method for providing an intrusion prevention system to prevent hacking into files located on enterprise users' endpoint devices functioning as mobile computing platforms. The method includes filtering low-level network packets for each of a plurality of received network packets, offloading the received packets to an inspecting processing module and marking suspicious packets based on at least one of a header and pattern of each of said received packets. The method also includes taking preventive measures by the system to ensure protection of the device and network, taking active steps by the system to block suspicious traffic and disconnecting the current connection by the system, when it detects suspicious traffic.

24 Claims, 11 Drawing Sheets

(56) References Cited

OTHER PUBLICATIONS

Avraham, T., "Non-Executable Stack ARM Exploitation Research Paper," Revision 1.0, 2010-2011, 19 Pages, [online] [retrieved on May 6, 2014] Retrieved from the internet <URL:http://media.blackhat.com/bh-dc-11/Avraham/BlackHat_DC_2011_Avraham_ARM%20Exploitation-wp.2.0.pdf.

Bell, D., "UML basics: The sequence diagram," IBM Corporation, Feb. 16, 2004, 15 pages, [online]0 [retrieved on May 6, 2014] Retrieved from the internet <URL:http://www.ibm.com/developerworks/rational/library/3101.html>.

Daniel, M., et al., "Engineering Heap Overflow Exploits with JavaScript," Usenix, 2008, 6 pages, [online] [retrieved on May 6, 2014] Retrieved from the internet <URL:https://www.usenix.org/legacy/event/woot08/tech/full_papers/daniel/daniel.pdf>.

"Linux Kernel kvm_dev_ioctl_get_supported_cpuid() code execution" linux-kernel-supportedcpuid-code-execution (53934), IBM Internet Security Systems, Oct. 23, 2009, 5 pages, [online] [retrieved on May 6, 2014] Retrieved from the internet <URL:http://xforce.iss.net/xforce/xfdb/53934>.

Renders, J-M., et al., "Hybrid Methods Using Genetic Algorithms for Global Optimization," IEEE Transactions on Systems, Man, and Cybernetics—Part B: Cybernetics, Apr. 1996, pp. 243-258, vol. 26, No. 2, can be retrieved at <URL:http://sci2s.ugr.es/eamhco/pdfs/renders96hmgs.pdf>.

Wang, X., et al., "Improving Integer Security for Systems with Kint," Proceeding OSDI'12 Proceedings of the 10th USENIX conference on Operating Systems Design and Implementation, 2012, 15 pages, can be retrieved at <URL:http://pdos.csail.mit.edu/papers/kint:osdi12.pdf>.

* cited by examiner

PREVENTIVE INTRUSION DEVICE AND METHOD FOR MOBILE DEVICES

FIELD OF THE INVENTION

The disclosed invention generally relates to the field of mobile application security and in particular to an intrusion prevention system, which can operate efficiently on mobile computing devices.

BACKGROUND OF THE INVENTION

In telecommunications network security systems and methods there are two known security models: intrusion prevention and intrusion detection. Intrusion prevention is typically active, while intrusion detection is passive, e.g. is used for reporting. There are several kinds of intrusion prevention systems, including network based and host based.

Intrusion detection systems constantly monitor the communications that flow in the network, which they protect and intercept or drop suspicious network traffic, as well as issue an alert to the network administrator. The process of intercepting or dropping suspicious traffic ensures the security of the network.

With mobile communication device computing, including smart-phones, tablets etc., becoming more popular, and public wireless networks becoming more common, the issue of security for mobile devices is becoming a greater concern. Currently, for mobile devices, no intrusion detection or prevention system is available.

The reason behind this lack of solutions for mobile devices is the fact that the intrusion detection and prevention systems are very resource intensive—i.e. they require intensive calculations from the CPU in order to perform the packet inspection process as well as the complex processing of application level protocols. This also drains the battery of the mobile devices, further complicating the matter.

In addition, attackers are constantly improving their attacks and techniques, constantly evolving, with the security industry in a constant race to catch up. One of the new types of attacks that are becoming common is using a hotspot to steal user information, user accounts, personal information etc., from unaware users who are connected to the same network as the attacker. The user whose information is being stolen, is completely unaware of this information theft.

For example, an enterprise user (hereinafter, the user) is in a mobile network with his mobile device connected to the Internet. A router and other devices may be connected to the network. Someone on the same network may try to attack his mobile device through the network. As both devices get network data, the attacking device can see the user's device. The attacker may have a mobile device or a computer in the same network. The attacker tries to do something malicious by sending the user a packet of network data. The user's device needs to interpret the network data in order to understand that there was an attack.

Thus, it would be advantageous to provide intrusion detection and/or prevention system for mobile devices.

SUMMARY OF THE INVENTION

The disclosed invention provides an intrusion prevention and detection system, which can be deployed on mobile computing communication platforms and devices (such as mobile phones, smart phones or tablets or any mobile computing platforms such is known in the art).

The present invention combines network based and host based solutions.

In one exemplary embodiment of the present invention an intrusion prevention system is disclosed whose processing requirements are offloaded by a specialized firmware.

In another exemplary embodiment of the present invention, the intrusion prevention system takes preventive measures to ensure protection of the device and network.

In one preferred embodiment of the present invention, the intrusion prevention system takes active steps to block suspicious traffic.

In yet another preferred embodiment of the present invention, the intrusion prevention system disconnects the current connection, when it detects suspicious traffic.

In yet another preferred embodiment of the present invention, the intrusion prevention system increases the security of the mobile computing device by providing a framework for 3rd party applications to receive application level security by obtaining keys to be used for authentication etc.

A method is disclosed for providing an intrusion prevention system to prevent hacking into files located on enterprise users' endpoint devices functioning as mobile computing platforms. The method includes filtering low-level network packets for each of a plurality of received network packets, offloading the received packets to an inspecting processing module and marking suspicious packets based on at least one of a header and pattern of each of said received packets. The method also includes taking preventive measures by the system to ensure protection of the device and network, taking active steps by the system to block suspicious traffic and disconnecting the current connection by the system, when it detects suspicious traffic.

The present invention is generally used for security purposes, such as for the mobile market for the enterprise, especially for devices belonging to enterprise endpoint users. This intrusion prevention and detection technology may run with normal privileges on low end applications, and is configured as a Bring Your Own Device (BYOD) solution. BYOD means the policy of permitting employees to bring personally owned mobile devices (laptops, tablets, and smart phones) to their workplace, and use those devices to access privileged company information and applications.

One embodiment of the invention may be configured by offloading packet inspection so it wouldn't steal resources such as battery power, CPU, memory. The present invention relates to packet inspection, firmware, the architecture of the product on the endpoint device and which layers are implemented.

The present invention identifies and prevents threats and attacks. A threat may manifests itself through an unexpected or unauthorized privilege escalation or networking anomaly. Many attacks result in privilege escalation, which can be identifiable as unauthorized, others are subtler. Some privilege escalations are identified as expected behavior, whereas others can be identified as unexpected or unauthorized. In order to prevent false positives threats or attacks without increasing the number of false negatives threats or attacks, the present invention provides network based behavioral analysis.

When there is enough data collected on the threats and attacks, convergence takes place and automatically create a new logic base, creating serialized data, which represents the attacks and the relationships with the data. After data is received from the network and is processed normally without being inspected, it affects operating system variables, but it does not affect them in a deterministic way. That is, if a particular variable has a certain configuration and another variable has a certain configuration, there is an overwhelming probability that there was an attack.

According to an aspect of some embodiments of the present invention there is provided a computerized system for preventing network attacks on a communication device which receive a plurality of network packets in a wireless communication network, the system comprising: a computer readable firmware, a Pattern Detector module configured to inspect the received packets and mark the received packets as suspicious or normal packets according to filtering settings; a packet filter module configured to filter the packets at a kernel level and transmit the received packets to the Pattern detector module; and a computer readable kernel extension module configure to receive the packets from the firmware module at an application level, detect the pattern of the marked packets and if the packets are not marked further examine the packets at the next lower software layer.

According to some embodiments of the invention, the system includes a zCore Application Program Interface (API) configured to be used by 3rd party applications.

According to some embodiments of the invention, the $3^{rd}$ party applications are external partner applications or developer applications. According to some embodiments of the invention, the system includes a 3rd party firmware connected to the packet filter configured to receive the packets.

According to some embodiments of the invention, there is provided a method d for preventing network attacks on a communication device, the method comprising: receiving a network packet at a computerized readable firmware module comprised or stored in said communication device; filtering the received packet at said firmware module by a packet filter module; marking the received packet as 'normal' or 'suspicious' packet by a pattern detector according to filtering settings criteria; offloading the received packet to a computerized readable zCore kernel extension module at a next software layer; detecting the pattern of the marked packet by said zCore kernel module; and offloading the normal packet to the next software layer.

According to some embodiments of the invention, there is provided a communication device including: a computer readable intrusion prevention firmware configured to prevent hacking into the device computing platforms, the firmware including: a WiFi firmware module configured to receive a plurality of network packets; a packet filter module configured to filter said received packets; a pattern detector module configured to detect the pattern of said received packets according to filtering settings criteria; and a secure storage module configured to store said filtering settings criteria.

In the present invention, the following terms are defined for sake of clarity:

The term "firmware" refers to the present invention security program and solution that is stored in the electronic circuit boards of for example, a mobile device. The firmware for example may be 'flushed' on a mobile device hardware (e.g. chip), after being extracted and flashed onto the mobile device chip, it may be executes as a replacement to a standard WiFi firmware.

The terms "kernel", "kernel/hardware" and "kernel extension" refer to part of an operating system which deals with basic hardware.

The term "zCore Kernel extension" refers to zcore.ko kernel object which is loaded on physical device (e.g. mobile device), or virtual device (e.g. software emulated device that can run on any environment).

The term "zCore API" refers to an API interface for $3^{rd}$ party applications (i.e. security applications operated by other vendors) with the intent to receive indicators for network events or threads and notify the present invention security program and solution.

The term "3rd party WiFi firmware" refers to a firmware device or chip that implements the IEEE 802.11 or abbreviate protocols for Wireless communication abbreviate (such as 802.11a,b,c,d,e,f, etc)

The term "$3^{rd}$ party application" refers to an application that may be implemented by external parties such as $3^{rd}$ partner or developer. For example the "zCore API" may supply other security solution vendors the ability to integrate and receive notifications or register new events.

The term "behavior attributes" relates to operating system's attributes that are being inspected to determine general behavior, or other attributes which can be regarded as general random variables.

The term "anomalies" in relation to "behavior attributes" refers to a scenario when abnormal correlation between parameters such as network packet parameters are detected, or normal behavior of protocol flaw is malfunctioned, an anomaly occurs and can be viewed on the data (e.g. in the packets) and the operating system's attributes that are affected by the data.

The term "zConsole" refers to management console which is used for visualization and management of devices such as mobile devices and corresponding threats and risk level. The zConsole allows configuration of the endpoint devices, and their security policies for prevention and mitigation of threats. The zConsole can be deployed on a cloud, or inside an organization DMZ (Demilitarized Zone) using for example the mobile device.

The term "notification of events" refers to events which are either informative events (usage events) or threat related to data.

The term "Threat Response Matrix" and "threat response matrix configuration" refers to a matrix which includes a number of response options for a plurality of threats types. For example, for network threat x1 a response Ri out of Rn responses is selected.

The severity of the response may be also weighted, and can be adapted according to risk level factors determined on recent history of the network that the mobile device is connected to.

The term "zIPS" or "zDefender" refers to an IPS (intrusion prevention system) product of the present invention being offered to enterprises and/or end users.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of a non-limiting example only, with reference to the accompanying drawings, in the drawings.

All the above and other characteristics and advantages of the invention will be further understood through the following illustrative and non-limitative description of preferred embodiments thereof.

DETAILED DESCRIPTION OF PREFERRED EMBODIMENTS

The present embodiments relate to network application security, more particularly, but not exclusively, to an intrusion prevention system, device and method, which can operate efficiently on mobile devices and platforms.

Currently, for mobile devices, no intrusion detection or prevention system is available. The reason behind this lack of solutions for mobile devices is the fact that the intrusion detection and prevention systems are very resource intensive—i.e. they require intensive calculations from the CPU in order to perform the packet inspection process as well as the complex processing of application level protocols. This also drains the battery of the mobile devices, further complicating the matter. In addition, attackers are constantly improving their attacks and techniques, constantly evolving, with the security industry in a constant race to catch up.

The present embodiments provide a solution which reduces overhead for protocol parsing and avoids the extreme usage of the mobile device OS and network resources by avoiding the inspection of all packets and route only anomalies through it rather than using operating system's protocol stack. This is achieved by separating the physical packet monitoring process from the logical detection engine to reduce dependability on the software or hardware layer. Moreover, instead of parsing all packets using packet capturing libraries such as pcap, netfilter, nbf, and other packet capturing methods known in the art, the present invention provides a system, device and method which trigger selective patterns for inspection and does not need to deeply inspect all packets received at the mobile device.

The principles and operation of a method and an apparatus according to the present invention may be better understood with reference to the drawings and the accompanying description, in which like numerals designate corresponding elements throughout, it being understood that these drawings are given for illustrative purposes only and are not meant to be limiting.

Figure 1:
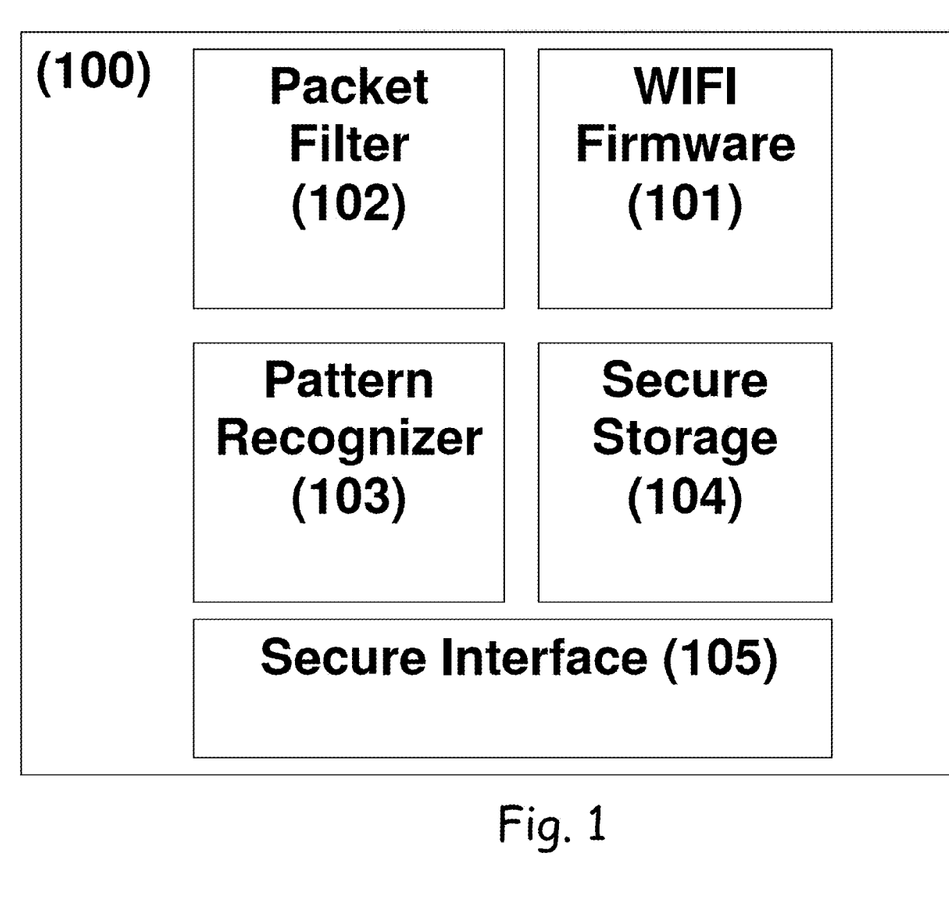
FIG. 1 illustrates the module configuration of the firmware, constructed according to the principles of the present invention.

FIG. 1 illustrates an exemplary module configuration of a firmware module 100, constructed according to the principles of the present invention. Firmware 100 is comprised of several sub-modules, the first of which is the 3rd party WiFi firmware 101. It should be noted that 3rd party WiFi firmware 101 refers to a plurality of WiFi manufacturers as is known in the art. Each vendor has its own interface specifications (e.g. hardware and/or software) of WiFi firmware 101.

According to some embodiments of the invention the 3rd party WiFi firmware 101 may be in communication or is connected to packet filter 102. The packet filter 102 responsibility is to filter packets, such as low-level packets that are received from the WiFi firmware 101 and transmit the packets to a Pattern Detector/recognizer module 103 for inspecting the received packets (as will be further illustrated in FIGS. 3, 4 and 6). The pattern recognizer module 103 may be also in communication with or connected to WiFi firmware 101 and packet filter 102. The Pattern recognizer module 103, is configured to handle a process of deep packet inspection in the firmware level (as shown for example in FIGS. 6 and 7b). Secure storage 104 is used by pattern recognizer 103 and packet filter 102 to save the filtering settings criteria (e.g. Pattern Match handler, pattern Conditions, pattern Constrains as shown in FIG. 7b) of pattern recognizer 102 and packet filter 103 and additional information that is required by the disclosed invention. According to one embodiment of the invention, a secure application interface 105 as shown for example in FIGS. 5a, 5b uses the secure storage 104 to specify the deterministic and heuristic patterns of the network packets required for the pattern filter 103.

Figure 2:
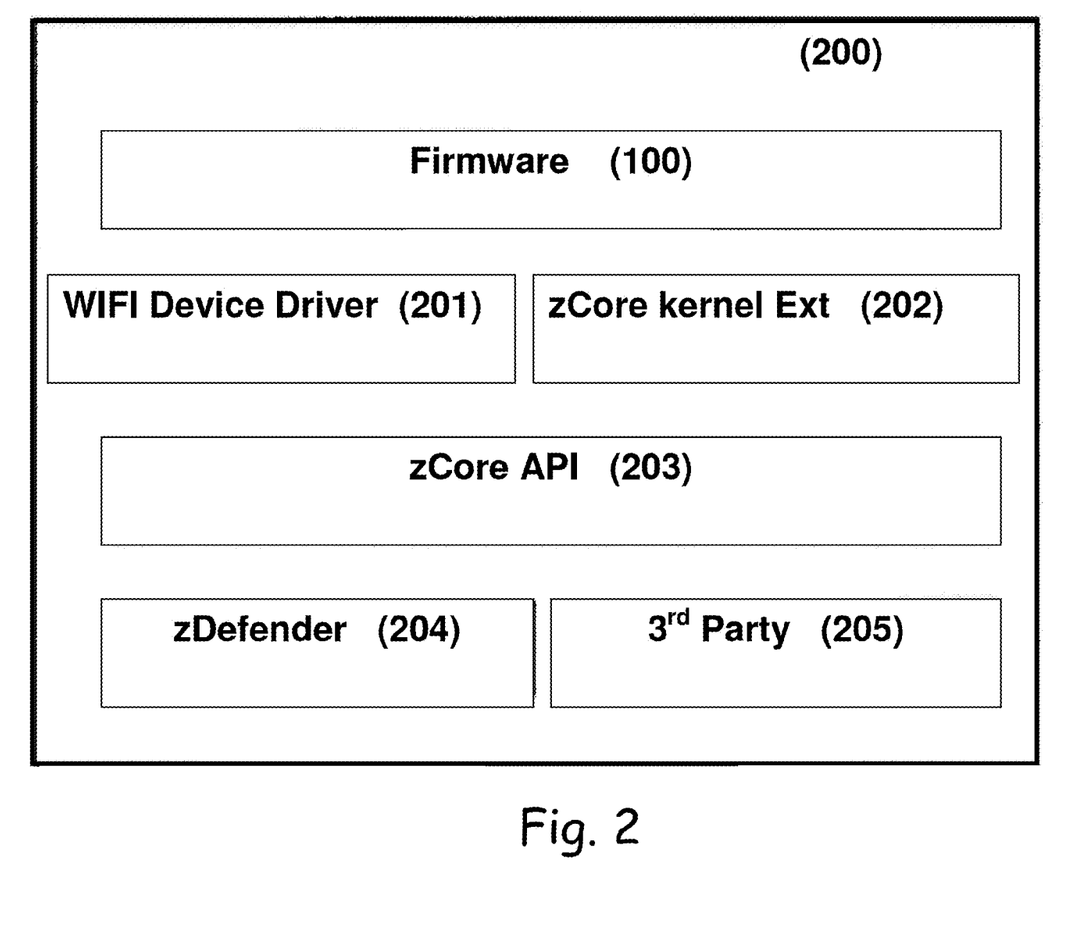
FIG. 2 illustrates the hierarchical structure of the system from a software perspective, constructed according to the principles of the present invention.

FIG. 2 illustrates the hierarchical structure of the system from a software perspective, constructed according to the principles of the present invention. FIG. 2 shows the software structure of the present invention, whereby the structure is divided into two main segments—a kernel/hardware level and an application level.

In the kernel/hardware level, one finds the WiFi firmware 100, with the functions described above, the WiFi device driver 201, which is the standard WiFi device driver provided by the hardware manufacturer and the zCore Kernel extension 202. The zCore Kernel extension 202 provides a kernel level API (Application Program Interface) to the firmware 100. This is used to pass functions and operations from the application level to the lower levels, e.g. to the kernel and hardware levels.

The zCore API 203 is used by 3rd party applications 205 (i.e. applications that may be implemented by 'external parties' such as external partner or developer) and the zDefender 204. Its functionality is to provide common interfaces for intrusion detection offloading at the firmware level by passing the packets to the zCore Kernel extension 202, and securely elevating permissions (as might be required by the mobile device OS) by 3rd party applications 205 or zDefender 204 and providing new and additional logic for the firmware 100 to process.

Third party applications 205 are standard applications, while zDefender 204 is a specific product, which provides network protection against specific attacks. zCore API 203 further provides the ability for other applications, such as the zDefender 204 or 3$^{rd}$ party applications 205 (such applications can include anti-virus and other security related applications), to register custom actions for protocol or application anomalies detected by the firmware 100.

According to some embodiments of the invention, there is provided a system and method which analyzes network protocols to automatically generate behavior trees describing each protocol. These behavior trees recognize anomalies on the protocol level, thus avoiding the need to drill down and analyze application level protocols. Additionally, the analyze process using behavior trees prevent false positives results and overhead on the network and user device. The data passed is structured and the fields that need to be constant are classified and compared to the session variables of the protocol.

This can be referred to as feature extraction technique. While there are many open source products that theoretically perform feature extraction, they are disadvantageously bloated with user level protocols that are not really relevant for smart devices and not optimized for mobile devices such as smart-phones. The present invention provides a novel framework, which also reduces overhead for protocol parsing. For example, Zcore checks and verifies that the network packet is not a breaking up protocol in terms of illegal structures, options, parameters, flags, checksums, etc. . . . in order to preserve battery lifetime and processing power. The present invention limits application level packet inspection on the network protocol side, and secures it from the host Intrusion Prevention System (IPS) side. Layout of the logic in the code enables an increase in the level of granularity and performs deep inspection.

System and Network Monitoring

According to some embodiments of the invention, physical packet monitoring is separated from the logical detection engine to reduce dependability on the software or hardware layer. An exemplary solution can be HW accelerated, by signaling the software layer of relevant packets/sessions that need inspection, which might require some modifications to the WIFI device driver, as illustrated in FIG. 6. Additional methods perform network monitoring by packet capturing, for example implemented with /dev/bpfX on BSD, netfilter socket on linux or pcap. The design allows hardware logic to signal the software layer with relevant packets, marked for inspection using queued I/O. The software engine inspects the packets deeper to realize if what happened is a positive sample or a negative sample, using the decision logic mentioned above.

Defining and Collecting Abnormal Behavior of an App

As explained above, the invention provides OS behavior analysis as described above, and covers both applications and services which are provided in the network.

For example, built in services and applications such as netd services, Bluetooth interface, void service, Webkit based Browsers, NFC services, etc., are monitored closely to avoid abnormal behavioral characteristics. Other applications and processes are monitored on a lower granularity level, making sure privileges are not being escalated. In order to detect malicious applications, applications execution per se are not tracked, but the focus is on capturing the Elevation of Privileges (EOP) performed by the app, meaning that even malicious applications will only be classified as malicious when trying to perform the malicious action manifested by privilege escalation. In this way, one can also identify malicious applications through behavioral analysis without using the traditional signature based approach to malware.

The analysis of the invention may be referred to as contextual, since one does not track a singular operation rather than a set of operations, in order to avoid contextual classification errors. Error rate is also monitored as part of the learning process: on test mode one increases the level of threshold, thus exponentially reducing the error rate.

Common network packets knowledge indicates that the amount of protocols that can be built is application specific; therefore deep packet inspection as provided by prior art solutions is redundant. Classifications of network packets alone as threats does not detect 'unknown' payload or application specific payload, which is malicious and possibly was a previously unidentified threat. Also, vast resources are consumed in order to decrypt/de-obfuscate the packets, making it virtually impossible to monitor threats that may even comply to the networking or application protocol, but viciously attacking the application layer. An additional layer of defense has been added, focusing on host level protection to handle unknown threats, analyzing the techniques used for successful attacks and preventing the methods themselves from running properly, thus mitigating risk without perquisite classification of the threat, but rather the classification of the technique allowing this threat to elevate privileges and execute.

Defending Against Attacks Aimed at Bypassing the Interception of the System Calls (e.g., Return Oriented Programming (ROP)

ROP is not possible when ASLR is activated, without additional processing since addresses are already randomized. Full ASLR and XN-bit enabled processes fully block return-oriented-programming technique since "gadgets" couldn't be instrumented to have a valid stack-pivoting and appropriate registers to modify the execution flow.

Tests Using Android Malware: Number of Samples; False-Positives and Negatives

Benchmarking is conducted once all the features are integrated and tested. using statistical data from currently active devices. zConsole monitors statistics and forensics of the data being sent to the cloud, closely monitoring the validity of data. To eliminate false positives hedging techniques are used to enable dynamic control of the threshold level used for each data set being classified.

Self-Tamper Detection to Protect from Hacker/Malware Attacks

The present invention obfuscates the processes, and prevents tampering with the executable. If one changes the content of the process it will not execute. For example, it does it statically on the process and dynamically de-obfuscates and decrypts the process on runtime, this ensures that static reversing becomes a non-trivial job for reversers.

Figure 3A:
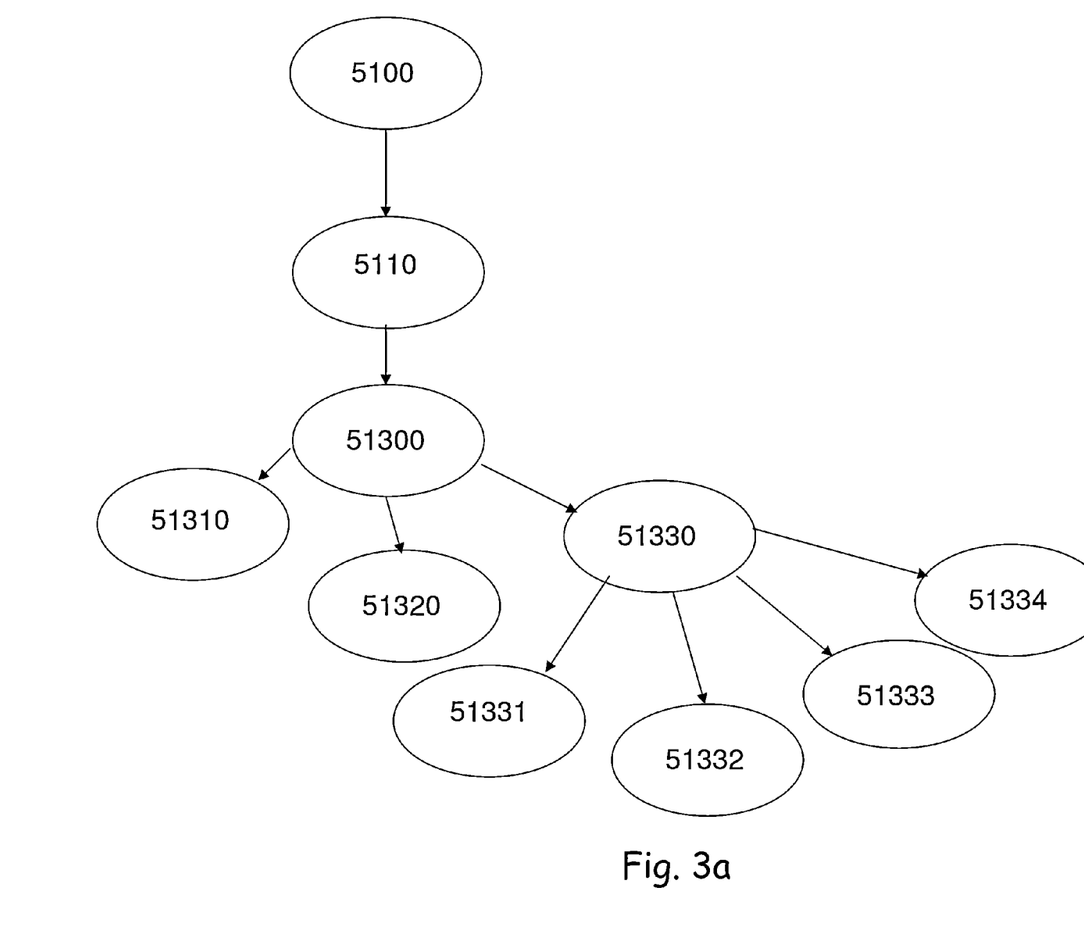
FIG. 3a is a flow diagram of the steps preceding and following a reconnaissance attack or "SYN" Attack Identification Branch in TCP, constructed according to the principles of the present invention.

Additionally, the present invention makes it extremely hard to attach debuggers to the process since the debuggers cannot correctly parse the section content of the image. This is done by using anti-debugging techniques that are not known-in-the-art FIG. 3a is a flow diagram of the steps preceding and following a reconnaissance attack or "SYN" in Transmission Control Protocol (TCP), constructed according to the principles of the present invention. In a SYN attack, a sender transmits a volume of connections that cannot be completed. This causes the connection queues to fill up, thereby denying service to legitimate TCP users. As an example of the underlying decision making algorithm, the following paragraphs discuss a branch of a behavior tree, which represents analysis of the TCP protocol. Some of the decision nodes are probabilistic and could cause a PASS/FAIL decision for the security software. These PASS/FAIL decisions depend on the specific policy which is in place for the device and could therefore result in the software signaling a new threat and potentially stopping the execution.

In FIG. 3a the steps are illustrated through an example which identifies a reconnaissance attack, the so-called SYN attack.

A SYN attack is an Attack Identification Branch in Transmission Control Protocol (TCP). This attack would be signaled through node 51332 and the flow leading up to identifying this attack is as follows:

1. 5100—TCP) NODE→uses sub nodes to monitor session authenticity (TCP session scatter gather, timers verification, reconnaissance, seq. attacks, etc. . . . )
2. 5110—TCP_BASE_OPS→checks for the validity of the packet, and performs initial protocol checks such as basic checksum calculations.
3. 51300—TCP_FLAG_CHECK→checks flags/options/variables which are more session oriented, in the illustrated flow it calls 51330, which is a collection of probabilistic nodes, each containing different threshold parameters, which inspect different threats running the parallel nodes for processing optimization.
4. 51331—SYN FLOOD—checks for SYN related attacks. Like flooding, it results in a successful state, and signals a threat when detected.
5. 51332—SYN/ACK/FIN SCAN—checks or threshold per source Internet Protocol (IP), for instance 192.168.1.12(x) sent (i) packets over delta time (dt) period of time, which translates to a simple calculation x(i)/dt<=threshold.
6. 51333—spoofing detection—this node checks if someone is trying to perform a SEQ/ACK attack
7. 51334—orphans/persistent timers attacks—this node checks for any attempt to use vulnerabilities in persistent TCP timers, or 'orphans.'

The nodes themselves inspect constraints and variables in for example a formatted way. Each set of nodes advances further in packet classification without redundant reiterations over the same data sets. The 'glue' for the nodes is a transition implemented within the nodes which can translate the tree into a state machine. This state machine cannot be formalized as Finite state machine for two reasons:

1. it is not finite, it is complex adaptive and it can regenerate rules. A rule is a 'bunch' of nodes in a graph illustrated in FIG. 3, with a certain level of membership function (described later) for each node.
2. The rules can be fuzzy, using probabilistic measurements and functions, so one can 'induce' rules from existing rules.

Figure 3B:
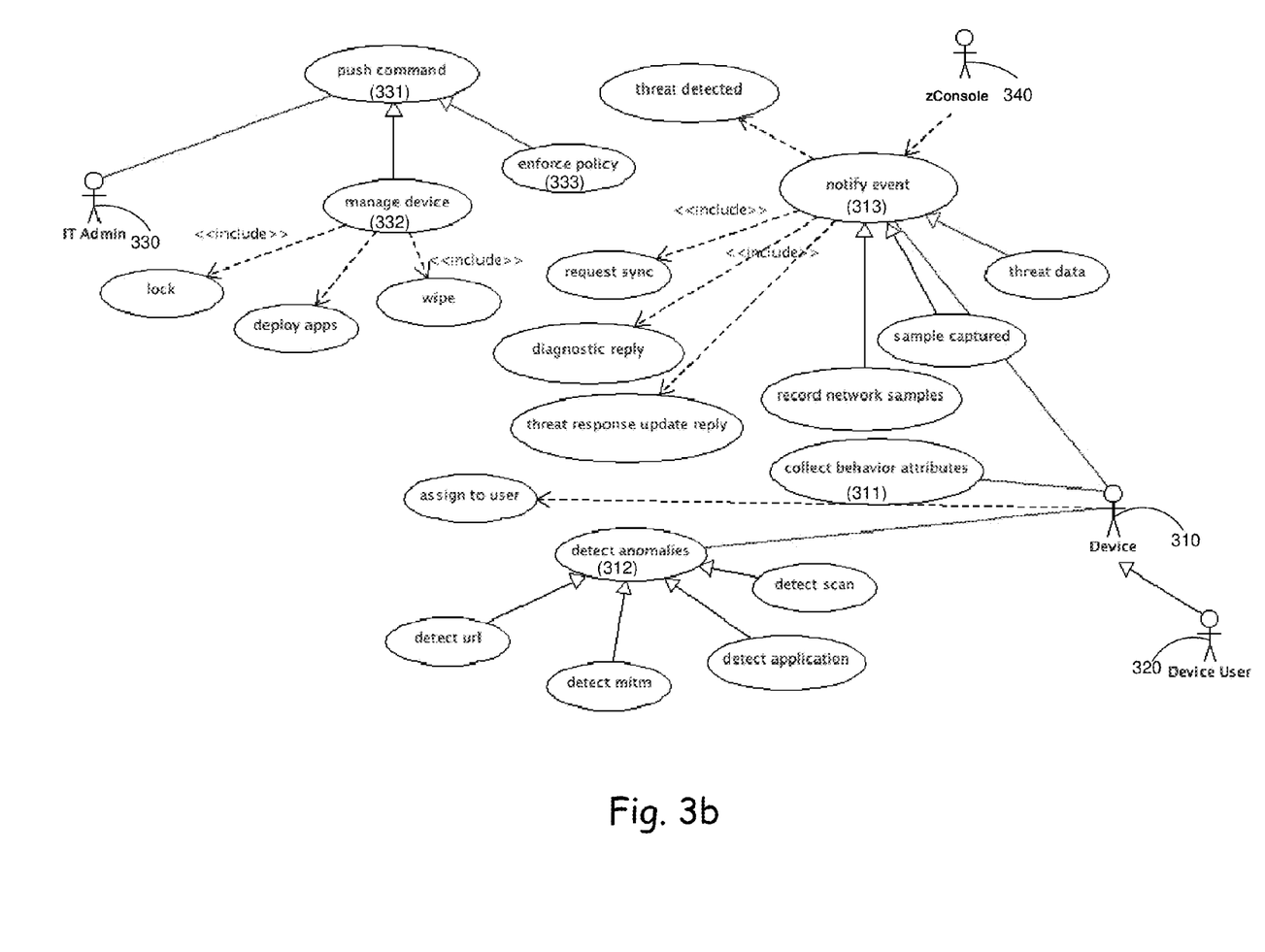
FIG. 3b is a use cases expansion diagram, constructed according to the principles of the present invention.

FIG. 3b is a use cases expansion diagram, constructed according to the principles of the present invention. A user device 310 belonging to the device user 320 collects behavior attributes 311, detects anomalies 312 and in coordination with a zConsole 340 provides notification of events 313. An IT Administrator 330 pushes commands 331 according to rules of device management 332 and policy enforcement 333.

Figure 4:
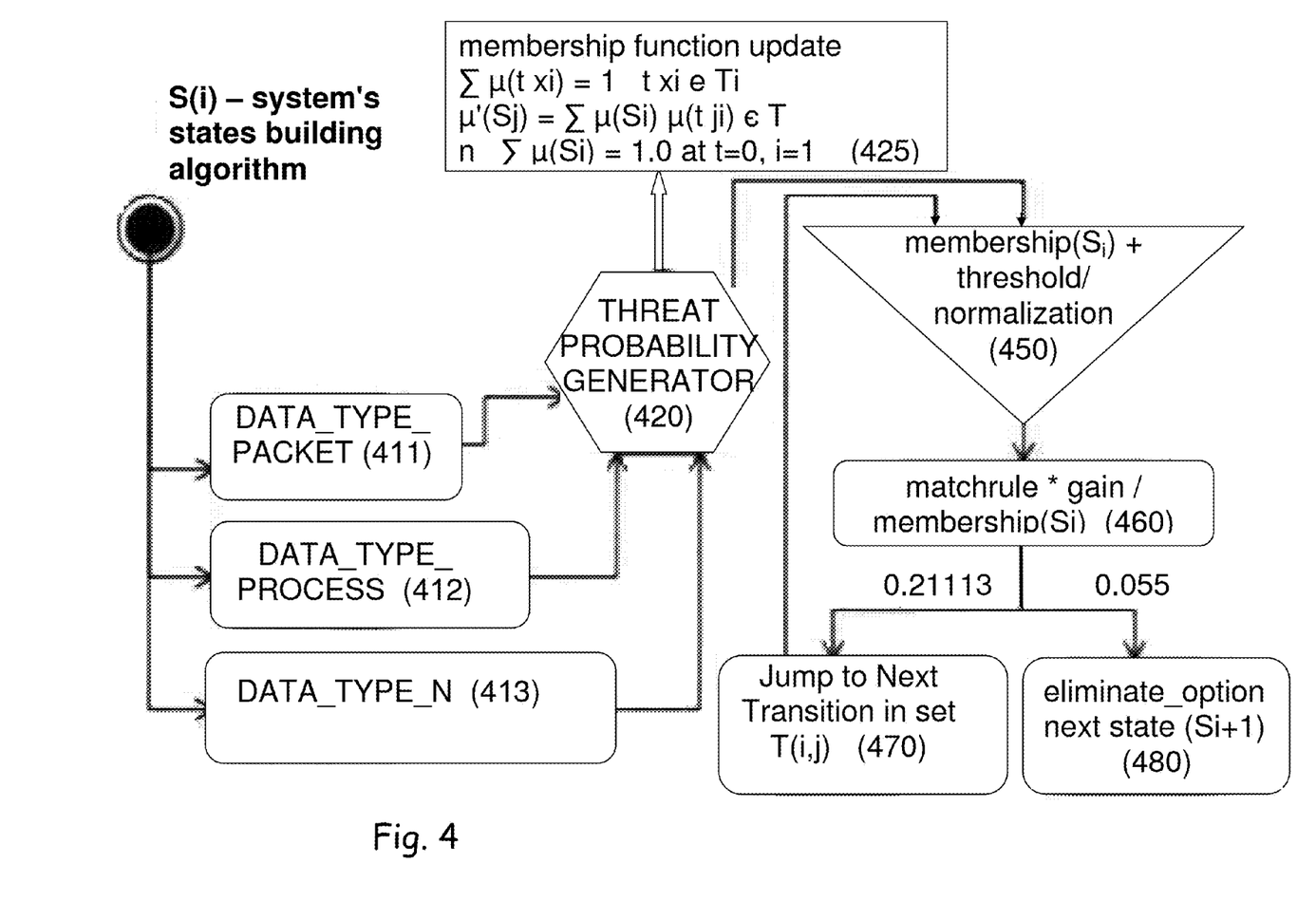
FIG. 4 is a flow diagram of the fuzzy state machine, constructed according to the principles of the present invention.

FIG. 4 is a flow diagram of the fuzzy state machine, constructed according to the principles of the present invention. When new rules are generated/'decided upon' the system's states building algorithm recalculates the membership function 425. Packets are comprised of data. Data is provided by the Threat Probability Generator 420: Data_Type_Packet 411; Data_Type_Process 411; and Data_Type_N 413. This is done on to zConsole, serialized and sent to zCore (reference block 202 of FIG. 2) client via sync request recalculation of the membership function 425.

Threat Probability Generator 420 also updates the membership($S_i$)+threshold/normalization 450, and then the matchrule*gain/membership(Si) 460. Then the system Jumps to the Next Transition in set T(i,j) 470 and the eliminates_option next state (Si+1) 480. The system continues iteratively by cycling back to update the membership($S_i$)+threshold/normalization 450 until convergence is achieved.

This technique allows one to change the logic of the detection engine without any change in the source file, since one is looking into variables and constraints with a limited set of operators (compare, add, dec, mul, etc).

Figure 5A:
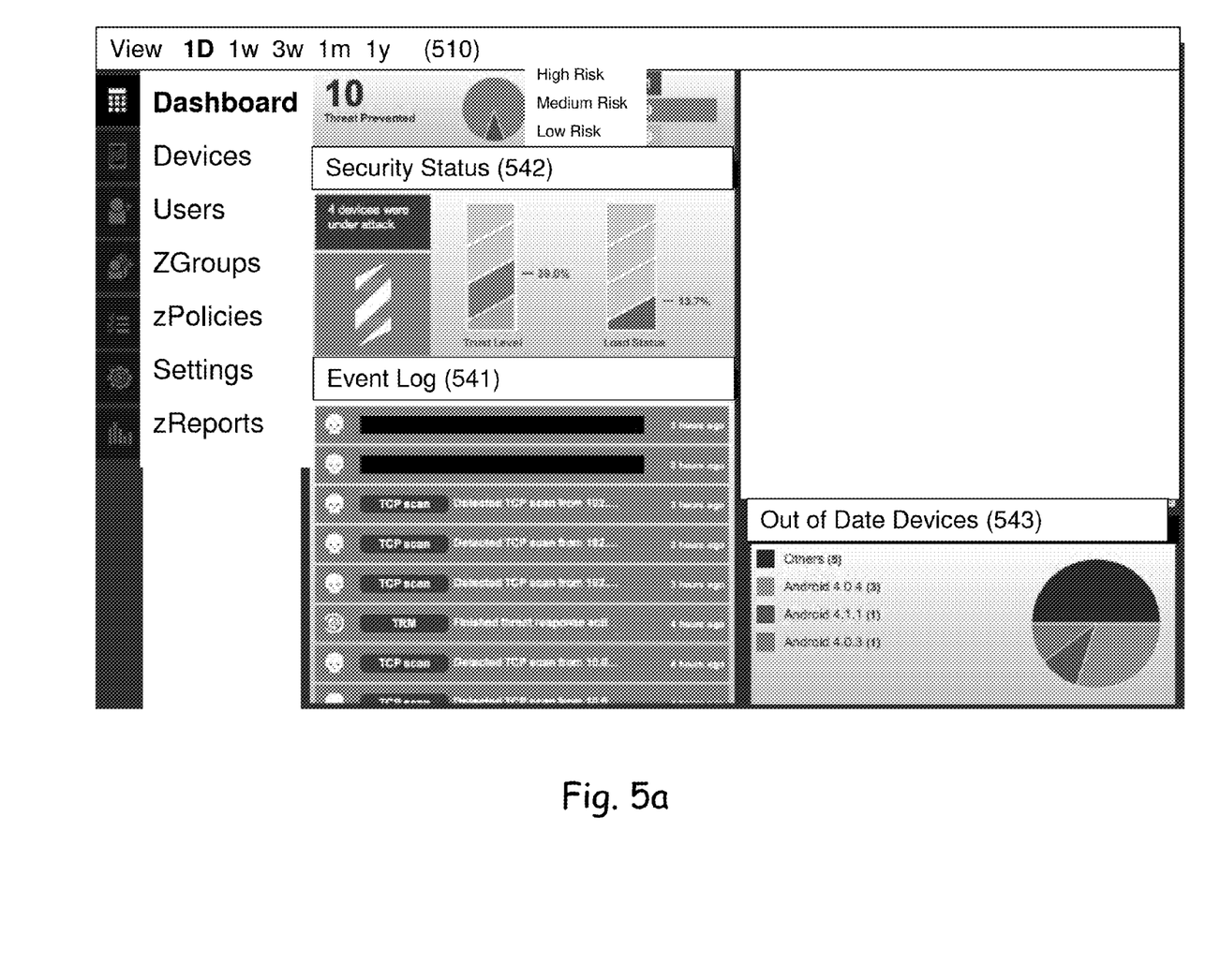
FIG. 5a is a screenshot the console for the dashboard, constructed according to the principles of the present invention.
Figure 6:
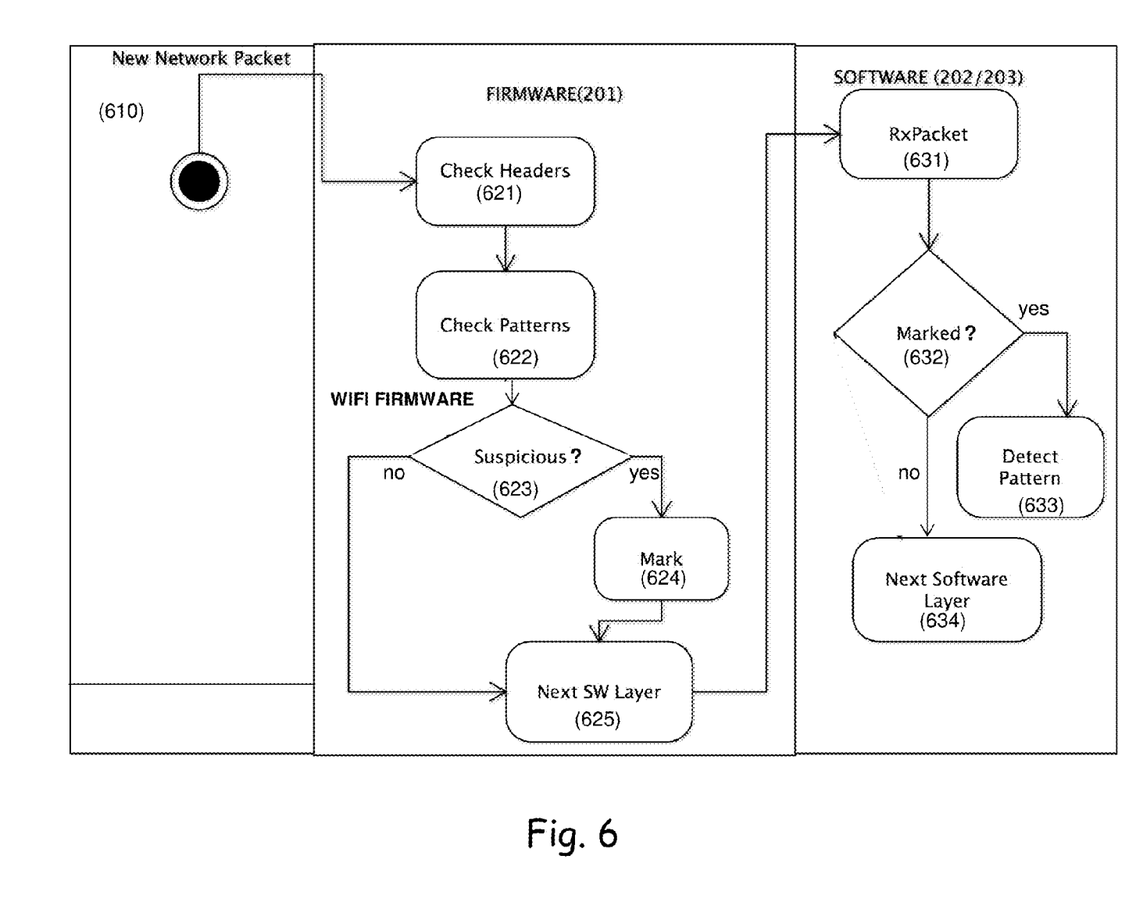
FIG. 6 is a flow chart of an exemplary hardware embodiment, constructed according to the principles of the present invention.

FIG. 5a is a screenshot of the console for the dashboard, constructed according to the principles of the present invention. Various time frames may be viewed 510, in this case for one day. Event log 541 shows the type, source and time of each event. Security status 542 shows the number of devices under attack, trust level and load status. Out of date devices 543 shows the type and number of devices no longer capable of being analyzed.

Figure 5B:
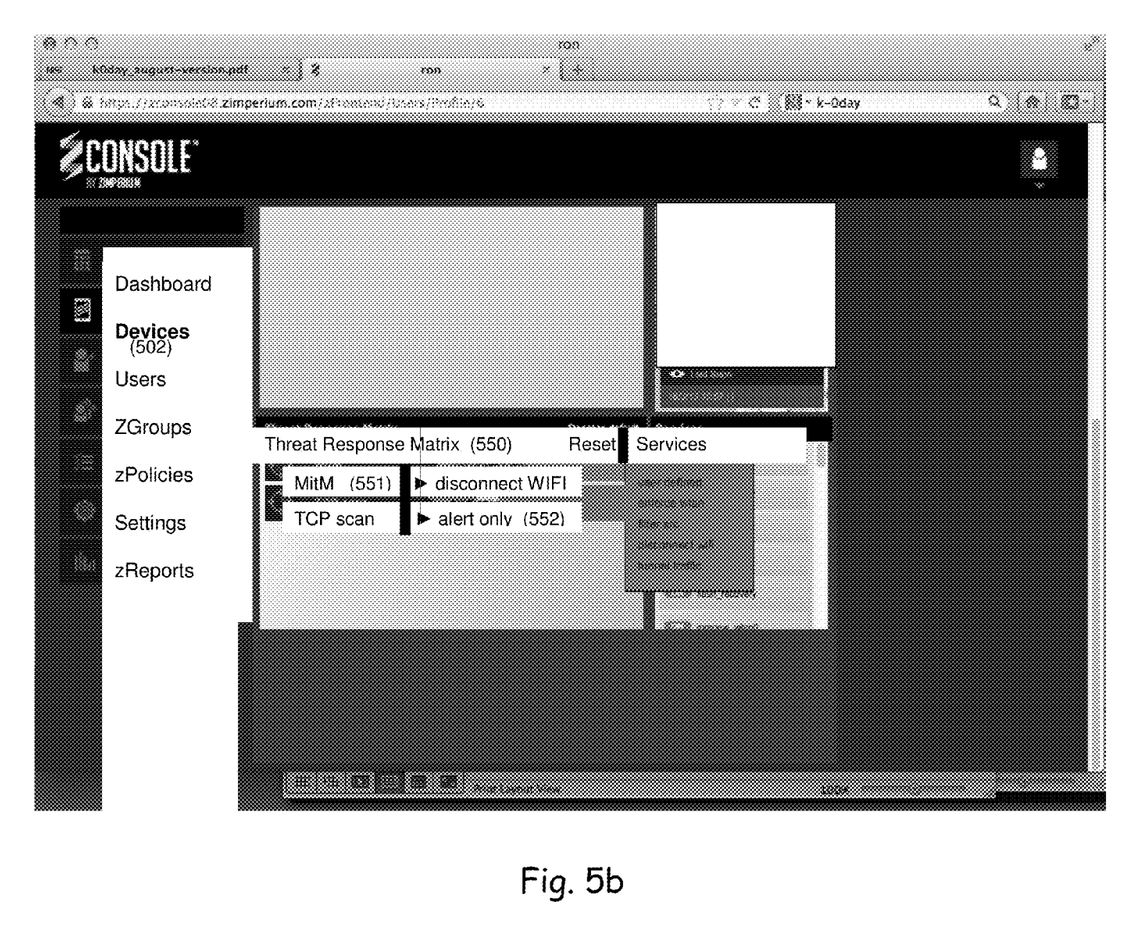
FIG. 5b is a screenshot the console for device management, constructed according to the principles of the present invention.

FIG. 5b is a screenshot of the console for device management 502, constructed according to the principles of the present invention. FIG. 5b shows zConsole's implementation of the threat-response-matrix configuration 550. The threat response matrix defines the action to be taken in a case of an attack, as part of the preventive measures.

Figure 5C:
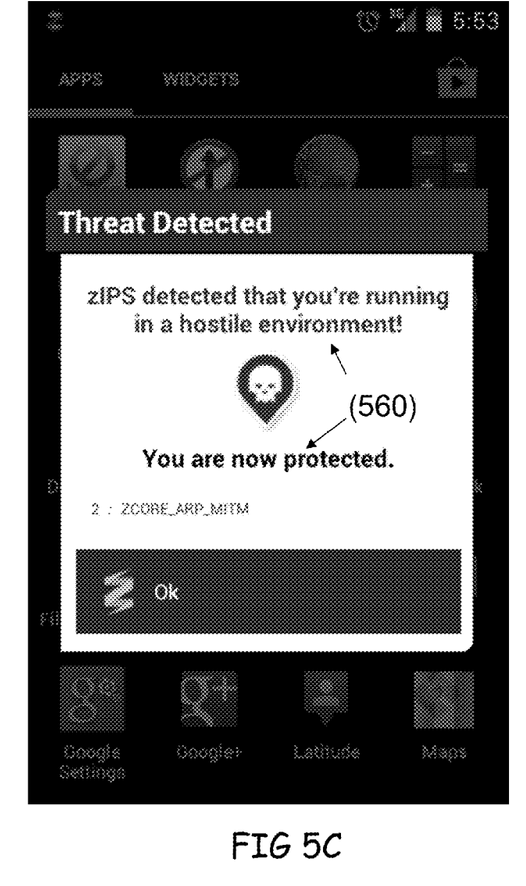
FIG. 5c is a screenshot of zIPS detecting an MITM attack on an android device constructed according to the principles of the present invention.

FIG. 5c is a screenshot of zIPS detecting a man in the middle (MITM) attack on, for example an android device, constructed according to the principles of the present invention. The MITM attack 551 intercepts a communication between two systems. For example, the target is a TCP connection between client and server. The attacker splits the original TCP connection into 2 new connections, one between the client and the attacker and the other between the attacker and the server. Once the TCP connection is intercepted, the attacker acts as a proxy, being able to read, insert and modify the data in the intercepted communication. In a TCP scan 552 port scanners use the operating system's network functions. If a port is open, the operating system completes the TCP three-way handshake, and the port scanner immediately closes the connection to avoid performing a kind of Denial-of-service attack. Threat detection messages are displayed at 560.

FIG. 6 is a flow chart of an exemplary embodiment, constructed according to the principles of the present invention. In step 610 a new packet is received by the network. Firmware 201 begins by checking headers 621 and checking for patterns 622. Firmware, such as WIFI firmware then determines whether the packet is suspicious 623. If suspicious the packet is marked accordingly 624 and is passed on to the software layer (e.g.—202, 203 shown in FIG. 2). The software layer 202, 203 first acknowledges that there is a new packet in the receive buffer (Rx) 631. If the packet has been marked 632 in reference block 624 the contribution to pattern detection 633 is determined; if not the next software layer is examined 634. Details of whether a packet is suspicious are described with respect to FIG. 3b, FIG. 4 and FIGS. 7a,7b.

Figure 7A:
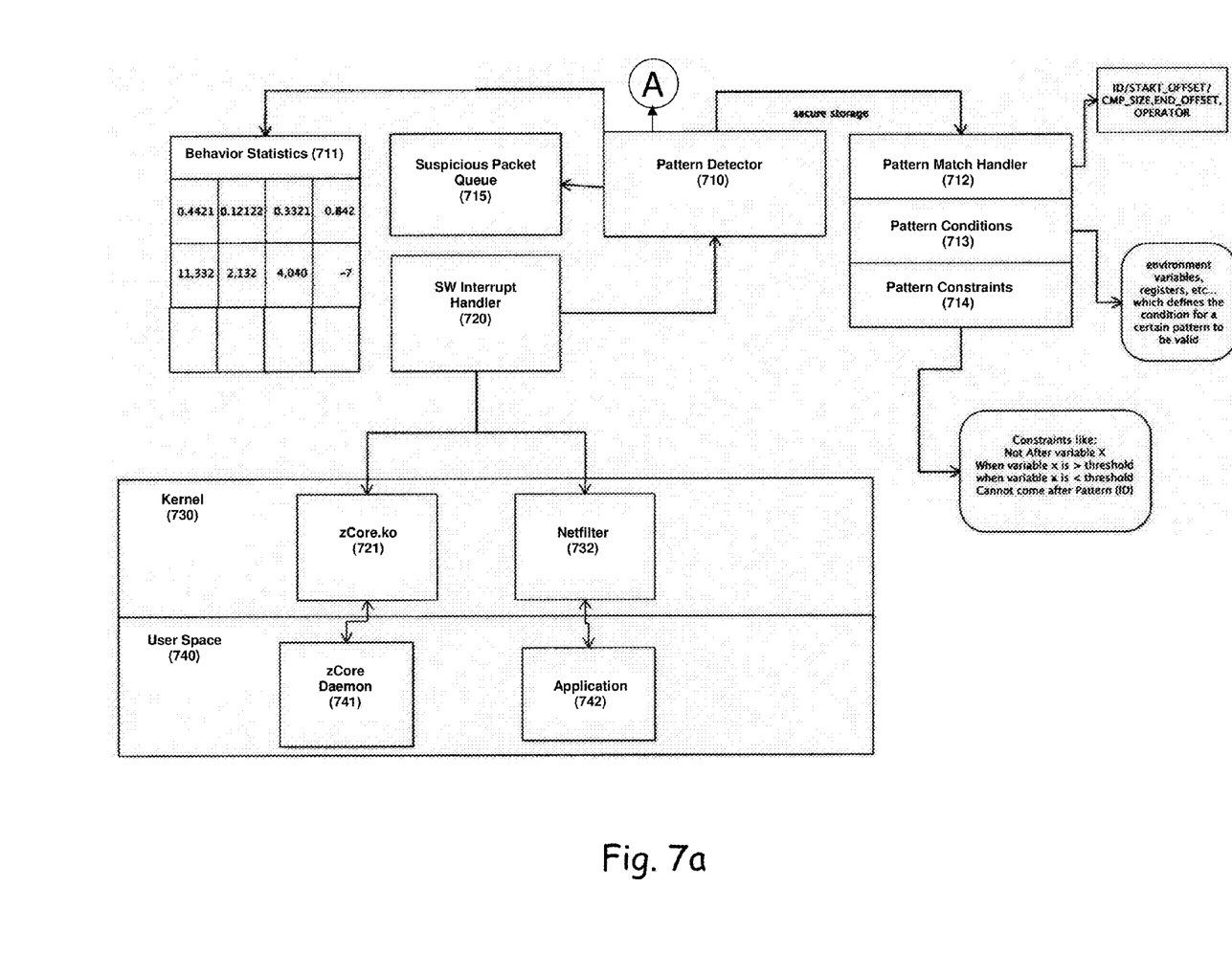
FIG. 7a is a flow diagram of the offloading inspecting processing module, constructed according to the principles of the present invention.
Figure 7B:
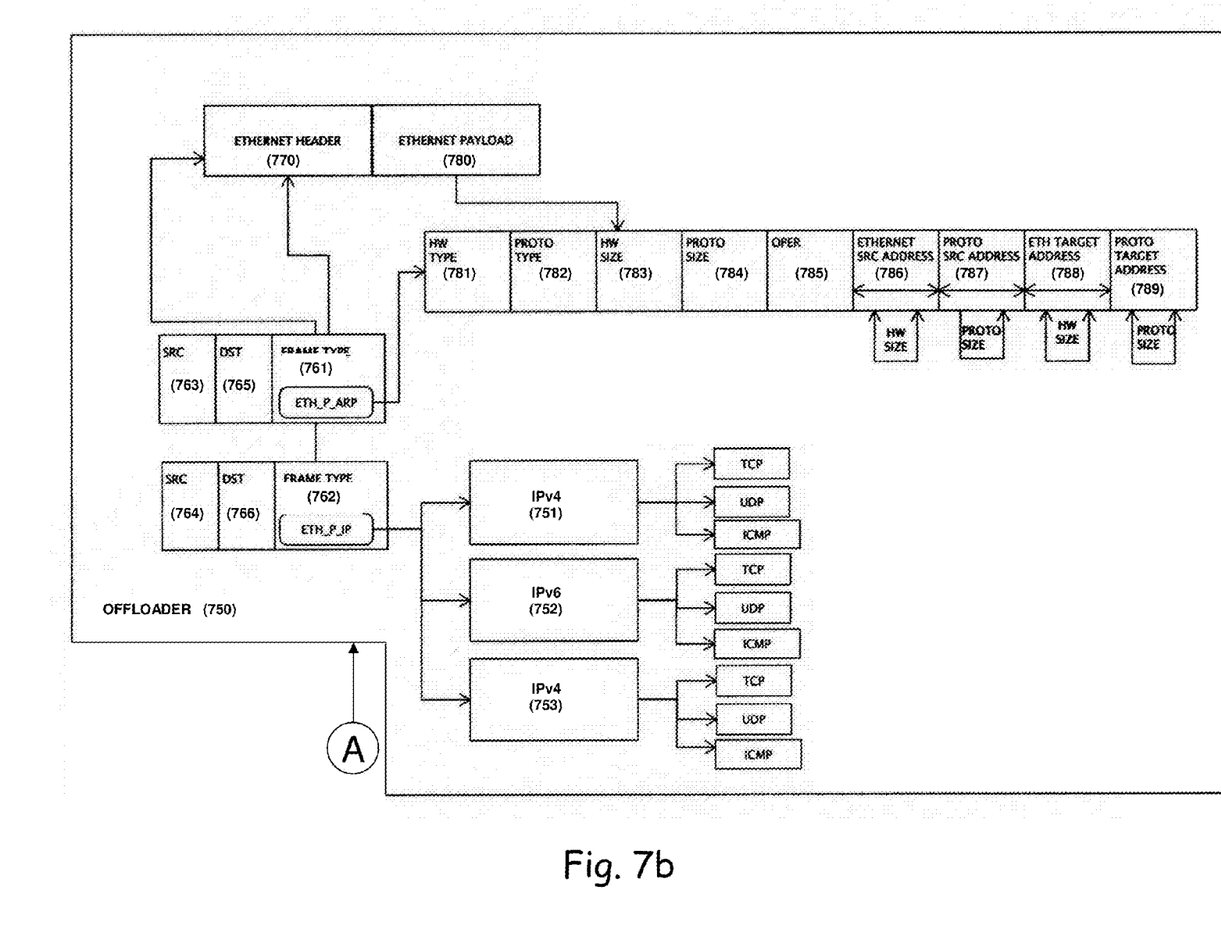
FIG. 7b is a flow diagram of the details of offloaded packet handling, constructed according to the principles of the present invention.

FIG. 7a is a flow diagram of the details of the offloading inspecting processing module, constructed according to the principles of the present invention. The pattern detector 710 compiles behavior statistics 711 and reacts to the pattern match handler 712, pattern conditions 713 and pattern constraints 714 by assigning suspicious packets to the suspicious packet queue 715. The SW interrupt handler 720 interacts with the kernel 730, comprising zCore.ko 731 and netfilter 732 and with the user space 740 comprising the zCore daemon 741 and the current application 742. Once a threat has been verified pattern detector 710 passes the information to the offloader of FIG. 7b, as indicated by common connector A.

The pattern detector (710) filters the incoming traffic and marks according to header sequences the probability of the current received packet to have anomaly (as shown in FIGS. 1 and 6). The pattern detector (750) uses Conditions (713), Constraints(714) and matching criteria (712) in order to avoid deep packet inspection, and check patterns of attack that have probability of an attack.

According to one embodiment of the invention, each packet of data affects the probability matrix (711) that represents the protocol state and the probability of having an anomaly in real-time according to address variables, data flow and protocol consistency checking. When a suspected operation is detected the packets are streamed into suspicious packets queue (715) and the software may access those packets using a SW interrupt implemented on the firmware (shown in FIG. 1) to handle such requests (720).

According to some embodiments of the invention, a software interrupt module (720) is provided to distinguish between Normal traffic (e.g. of packets) and Malicious traffic, and transfer the malicious traffic to a different software layer to securely analyze the protocol which may risk the communication device or the network system.

A kernel software layer (730) is configured to handle interrupts and requests on the device, and interact with the device hardware. An operating system's protocol stack (732) implemented in kernel space for protocols and packets received over the network. Zcore.Ko (721) is the kernel extension (shown in FIG. 2) configured to avoid inspection of all packets and route only anomalies through it rather than using operating system's protocol stack kernel extension (732). Therefore, instead of reaching the non suspecting protocol stack handler (721) the packets ends up being inspected thoroughly via the zCore application (741) which filters noises, and inspects each use case thoroughly in order to get a decision. Thus, instead of parsing all packets using packet capturing libraries such as pcap, netfilter, nbf, and other packet capturing methods known in the art, the present invention solution triggers selective patterns for inspection and does not need to deeply inspect all packets on software.

FIG. 7b illustrates a data transmitted over the network in a packet form constructed according to the principles of the present invention. The packet consists of Ethernet header data (770) and corresponding data payload (780). As shown in FIG. 7b ARP type packets and IP packets are received and parsed. The packet includes: packet header src (763) address, destination address (765) and the frame type field (761), which can be ETH_P_ARP or ETH_P_IP.

According to the frame field (761) value the pattern detector can recognize the protocol type and the correct offsets, which may be compared against a set of value representing pattern of attack.

The data payload (780) consist a case of ETH_P_ARPan ARP protocol header as known in the art, consisting of HW Type (781), Protocol Type (782), Hardware address size (783), Protocol size(784), Operation (785) and corresponding fields: HW SRC address (786) which has the length indicated as Hardware address size (783). (787) is the protocol source address, and its size is as indicated on protocol size (784), the target HW address (788) indicts a packet request its length corresponding to the length indicated on HW size (783). Proto target address (789) is the target protocol address, with the specified length indicated as protocol size (784).

The Data Payload (780) may include IP based protocols, when the field value for the packet header (761) equals to ETH_P_IP. The payload may include IPv4 based data (751) or IPv6 (752) packets according to the protocol received in the header. Both IPv4 packets and IPv6 Packets may layer protocols as UDP, TCP, or ICMP.

The present embodiments apply to wireless networks including WiFi (such as IEEE 802.11a,b,c,d,e,f, etc.) but not limited thereto. The embodiments are also relevant to Code Division Multiple Access (CDMA), CDMA-2000 and wideband CDMA (WCDMA) cellular radiotelephone receivers for receiving spread spectrum signals, Global System for Mobile communication (GSM) cellular radiotelephone, General Packet Radio Service (GPRS), Extended GPRS (EG-PRS), third generation cellular systems (3G), 3GPP Long Term Evaluation (LTE) and the like. For simplicity, although the scope of the invention is in no way limited in this respect, embodiments of the invention described below may be related to a CDMA family of cellular radiotelephone systems that may include CDMA, WCDMA, CDMA 2000 and the like. Alternatively, embodiments of the invention may well be implemented in wireless data communication networks such as those defined by the Institute for Electrical and Electronics Engineers (IEEE).

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A computerized system for preventing network attacks on a communication device configured to receive a plurality of network packets in a wireless communication network, the system comprising:
   a non-transitory a computer readable storage medium storing executable modules comprising:
   a secure interface module that identifies deterministic patterns and heuristic patterns of the received network packets;

a packet filter module that filters the received packets based on the identified deterministic patterns and heuristic patterns of the received packets, and to output filtered packets;

a pattern detector module that inspects the filtered network packets from the packet filter module and in response to the inspection, to classify the received network packets as suspicious or normal based on stored filtering settings; and a kernel extension module that receives the filtered packets, to detect patterns of the packets classified as normal and to further examine the packets classified as suspicious, and a processor that executes the stored modules.

2. The system of claim 1, further comprising a zCore Application Program Interface (API) module that is used by 3rd party applications.

3. The system of claim 2, wherein the 3rd party applications are external partner applications or developer applications.

4. The system of claim 2, wherein the 3rd party applications that enables security solution vendors receive notifications of intrusions or register new intrusions events.

5. The system of claim 1, further comprising a 3rd party firmware module communicatively coupled to the packet filter module, the 3rd party firmware module that receives the network packets.

6. The system of claim 5, wherein the 3rd party firmware module is a WiFi firmware module.

7. The system of claim 1, wherein the filtering settings are selected from the group consisting of: a pattern matches handling, pattern conditions, and pattern constraints.

8. The system of claim 1, further comprising a threat response module defining one or more actions to be taken in response to detecting a pattern of classified packets indicative of an attack.

9. The system of claim 8, wherein the threat response module that represents one or more communication device protocol states and a probability for each protocol state being associated with an anomaly.

10. A method for preventing network attacks on a communication device comprising at least one processor, comprising:

receiving, at the communication device, a plurality of network packets;

filtering, by the communication device, the received packets based on identified deterministic patterns and heuristic patterns of the received packets, and to output filtered packets;

classifying the filtered packets as 'normal' or 'suspicious' based on stored filtering settings;

detecting patterns of the packets classified as 'normal'; and further examining packets classified as 'suspicious'.

11. The method of claim 10, wherein the network packets are received by a 3rd party firmware stored on the communication device.

12. The method of claim 11, wherein the 3rd party firmware is a WiFi firmware.

13. The method of claim 10, further comprising taking one or more actions in response to detecting a pattern of classified packets indicative of an attack, the actions specified by a thread response module that represents one or more communication device protocol states and a probability for each protocol state being associated with an anomaly.

14. A communication device comprising:

a non-transitory computer-readable storage medium storing executable modules comprising:

a WiFi firmware module that receives a plurality of network packets;

a packet filter module that filters the received network packets based on identified deterministic patterns and heuristic patterns of the received network packets, and to output filtered packets;

a pattern detector module that detects patterns of the received network packets according to stored filtering settings criteria; and an action module that takes one or more corrective actions in response to the detected patterns being indicative of an attack; and a processor that executes the stored modules.

15. The communication device of claim 14, wherein the communication device comprises one of: a mobile phone, a smart phone, a laptop computer, or a tablet computer.

16. The communication device of claim 14, wherein the communication device is host-based and/or network-based.

17. A method for providing an intrusion prevention system to prevent attacks on a mobile device which transmit information in a communication network, the method comprising:

receiving a plurality of network packets;

filtering, by a processor, the received network packets based on identified patterns of the received network packets;

providing the filtered network received packets to an inspecting processing module that classifies a subset of the network packets comprising less than a threshold percentage of the filtered network packets;

classifying, by the inspecting processing module, the subset of the network packets suspicious packets based on at least one of: headers associated with the subset of network packets, and patterns of the subset of network packets; and in response to the detection of an attack based on the classified subset of the network packets, taking one or more preventive measures at the mobile device to mitigate or prevent the attack.

18. The method of claim 17, wherein the mobile device comprises one of; a mobile phone, a smart phone, a laptop computer or a tablet computer.

19. The method of claim 17, wherein the intrusion prevention system is host-based and/or network-based.

20. The method of claim 17, wherein the attack is detected in response to a pattern in the classified network packets indicative of an unauthorized privilege escalation.

21. The method of claim 17, wherein the intrusion prevention system comprises at least a packet filter, a WIFI software storage and a pattern recognizer.

22. The method of claim 21, wherein the pattern recognizer is trained to recognize and record attacks.

23. The method of claim 21, wherein the one or more preventative measures include disconnecting the mobile device from the communication network.

24. The method of claim 17, wherein the one or more preventive measures include blocking suspicious traffic.

* * * * *